United States Patent [19]
Klein

[11] Patent Number: 6,145,368
[45] Date of Patent: Nov. 14, 2000

[54] METHOD FOR CALIBRATING ROTARY ENCODER WITH MULTIPLE CALIBRATION POINTS

[75] Inventor: Dean A. Klein, Eagle, Id.

[73] Assignee: Micron Electronics, Inc., Nampa, Id.

[21] Appl. No.: 09/089,864

[22] Filed: Jun. 3, 1998

[51] Int. Cl.⁷ .................................................. G01P 21/00
[52] U.S. Cl. .................... 73/1.75; 73/1.79; 250/252.1; 250/231.18
[58] Field of Search ................................ 73/1.75, 1.79, 73/1.37, 170.01–170.03, 170.05, 170.06; 250/252.1 A, 252.1 R, 231.13–231.18

[56] References Cited

U.S. PATENT DOCUMENTS

| | | | |
|---|---|---|---|
| 2,782,626 | 2/1957 | Jochum et al. | 250/231.16 X |
| 3,349,325 | 10/1967 | Bajars | 250/252.1 A |
| 4,649,267 | 3/1987 | Roy | 250/231.17 X |
| 4,697,077 | 9/1987 | Weber et al. | 250/252.1 A |
| 4,718,879 | 1/1988 | Wada | 250/252.1 A X |
| 4,945,231 | 7/1990 | Ohya et al. | 250/231.18 X |
| 4,988,865 | 1/1991 | Schmidt et al. | 250/231.16 |
| 5,086,641 | 2/1992 | Roselli | 73/1.79 |
| 5,130,536 | 7/1992 | Sato et al. | 250/231.17 |
| 5,212,380 | 5/1993 | Sato et al. | 250/231.17 |
| 5,418,362 | 5/1995 | Lusby et al. | 250/231.18 |
| 5,594,241 | 1/1997 | Li et al. | 250/231.17 |
| 5,665,974 | 9/1997 | Truong | 250/231.18 X |
| 5,852,413 | 12/1998 | Bacchi et al. | 250/231.18 X |
| 5,939,712 | 8/1999 | Venugopal et al. | 250/231.13 |
| 5,969,344 | 10/1999 | Tseng | 250/231.13 |

FOREIGN PATENT DOCUMENTS

| | | | |
|---|---|---|---|
| 115381 | 8/1984 | European Pat. Off. | 73/1.75 |
| 374295 | 6/1990 | European Pat. Off. | 73/1.75 |
| 59-226822 | 12/1984 | Japan | 250/231.18 |
| 1053124 | 11/1983 | U.S.S.R. | 73/1.75 |

*Primary Examiner*—Thomas P. Noland
*Attorney, Agent, or Firm*—Park & Vaughan LLP

[57] ABSTRACT

One embodiment of the present invention provides a method for calibrating a rotary encoder including a rotatable disk including at least two index points located along a circumferentially extending row. These index points contain information specifying an angular position of the index point. This allows the rotary encoder to be calibrated by turning it through a sufficient angular displacement to ensure that an index point passes over a sensor. This sufficient angular displacement is less than a complete revolution because there are multiple index points along the circumference of the disk. This design allows a rotary encoder to be calibrated without turning it through a complete revolution. This is advantageous where turning the rotary encoder through a complete rotation is not possible or is inconvenient, for example in applications such as a wind direction indicator, a rudder position indicator or a joystick. Thus, one embodiment of the present invention includes a method for calibrating a rotary encoder including a rotatable disk with at least two index points located along a circumferentially extending row on the rotatable disk. The method includes turning the rotary encoder through a sufficient angular displacement to ensure that an index point passes over a first sensor in the rotary encoder, the sufficient angular displacement being less than a complete revolution. The method also includes reading an index point signal through the first sensor, and decoding the index point signal to obtain an angular position value for the index point. The method additionally includes using the angular position value to calibrate the rotary encoder.

13 Claims, 5 Drawing Sheets

METHOD FOR CALIBRATING ROTARY ENCODER WITH MULTIPLE CALIBRATION POINTS

RELATED APPLICATION

The subject matter of this application is related to the subject matter in U.S. patent application Seri. No. 09/089,985, filed Jun. 3, 1998, pending.

BACKGROUND

1. Field of the Invention

The present invention relates to rotary encoders for detecting an angle of rotation, and more particularly to a rotary encoder including multiple calibration points allowing the rotary encoder to be calibrated by turning it through only a fraction of a complete 360-degree rotation.

2. Related Art

Rotary encoders are the sensor of choice for generating a digital output to accurately measure rotational motion. Encoders are often attached to high performance spindles in systems such as high precision machine tools and laser scanners. They are used to measure rotational parameters such as shaft angle position, velocity and direction of rotation.

A rotary encoder typically has two or three signal channels. One of these channels is generally a one-pulse-per-revolution index channel, and the other channels are generally multiple-pulse-per-revolution data channels. The number of pulses per revolution on a data channel is typically between a few hundred and a few thousand depending upon the resolution required for fine position control. These signals are often fed into a control system to provide real-time information regarding the position, velocity and rotational direction of the spindle.

The index channel pulse is used to indicate the beginning of each spindle revolution, and the data channel(s) signal is used to indicate the speed of the rotor and the angular position of the rotor within a revolution. For some types of encoders (such as a quadrature type encoder) there is an additional channel which provides information on the direction of the spindle.

FIGS. 1A and 1B illustrate portions of a prior art rotary encoder. The rotary encoder illustrated in FIGS. 1A and 1B includes rotatable disk 100, which is coupled to shaft 101. Shaft 101 is coupled to a rotational input, such as a spindle for a machine tool, so that rotating the spindle cases shaft 101 and disk 100 to rotate. Disk 100 includes two channels comprising circumferentially extending rows of transparent openings through which light can pass. In the illustrated example, the inner channel is an index channel 102, with a single opening (pulse) per revolution specifying an index position. The outer channel is a data channel 104 with a large number of openings (pulses) specifying incremental angular displacements of disk 100. Rotatable disk 100 is typically composed of glass, and the openings which form index channel 102 and data channel 104 are typically etched in rotatable disk 100.

In the illustrated example, information from index channel 102 and data channel 104 is retrieved optically. Light emitting device 106 generates light, which passes through index channel 102 and feeds into light receiving device 112. The signal from light receiving device 112 passes into signal processing device 114, which detects and decodes the index pulse from index channel 102. Similarly, light emitting device 108 generates light, which passes through data channel 104 and feeds into light receiving device 110. The signal from light receiving device 110 passes into signal processing device 114, which detects and decodes an angular displacement signal from data channel 104. Light emitting devices 106 and 108 are typically implemented using light emitting diodes (LEDs) or lasers. Light receiving devices 110 and 112 are typically implemented using photodiodes. Signal processing device 114 is typically implemented with a device controller or a microprocessor.

One problem with the above-described rotary encoder design is that it requires up to a complete revolution of the rotary encoder to detect the pulse on the index channel in order to calibrate the rotary encoder. Turning the rotary encoder through a complete revolution may not be possible or may be inconvenient for certain applications, such as a wind direction indicator, a rudder position indicator or a joystick.

What is needed is a rotary encoder that can be calibrated without having to turn it through a complete revolution.

A rotary encoder with multiple index points has previously been disclosed. See U.S. Pat. No. 5,130,536, entitled "Optical Rotary Encoder with Indexing," to Sato et al. However, the rotary encoder disclosed in Sato was developed to facilitate the firing of spark plugs, not for purposes of calibration. Hence, the multiple index points in Sato do not contain information specifying angular positions for the index points for purposes of calibration. In FIG. 2 of the Sato patent, the zero angle index point contains a marker with two openings to differentiate it from the other index points. The other index points merely include a marker with a single opening, and these other index points cannot be differentiated from one another for purposes of calibration. (See FIG. 2) Hence, it is necessary to turn the rotary encoder disclosed in Sato through almost a complete revolution in order to calibrate it. (Strictly speaking, it is possible to calibrate this encoder by turning it though 1–1/N revolutions, where N is the number of index points.)

SUMMARY

One embodiment of the present invention provides a method for calibrating a rotary encoder including a rotatable disk including at least two index points located along a circumferentially extending row. These index points contain information specifying an angular position of the index point. This allows the rotary encoder to be calibrated by turning it through a sufficient angular displacement to ensure that an index point passes over a sensor. This sufficient angular displacement is less than a complete revolution because there are multiple index points along the circumference of the disk. This design allows a rotary encoder to be calibrated without turning it through a complete revolution. This is advantageous where turning the rotary encoder through a complete rotation is not possible or is inconvenient, for example in applications such as a wind direction indicator, a rudder position indicator or a joystick. Thus, one embodiment of the present invention includes a method for calibrating a rotary encoder including a rotatable disk with at least two index points located along a circumferentially extending row on the rotatable disk. The method includes turning the rotary encoder through a sufficient angular displacement to ensure that an index point passes over a first sensor in the rotary encoder, the sufficient angular displacement being less than a complete revolution. The method also includes reading an index point signal through the first sensor, and decoding the index point signal to obtain an angular position value for the index point. The method additionally includes using the angular position value to calibrate the rotary encoder.

In one embodiment of the present invention, turning the rotary encoder includes turning a rotatable disk with a circumferentially extending row of at least two index points located on equally-spaced radii. In this embodiment, each index point encodes information specifying an angular position of the index point along the circumference of the disk.

Another embodiment of the present invention includes reading an angular displacement signal from a second sensor disposed over a data channel on the rotatable disk. In a variation on this embodiment, reading the index point and angular displacement signals includes reading signals from the same circumferentially extending row on the disk (see FIG. 5A and FIG. 5B). In another variation on this embodiment, reading the index point and angular displacement signals includes reading signals from different circumferentially extending rows on the disk.

In another embodiment of the present invention, decoding the index point signal to obtain an angular position value includes decoding signals from openings of differing lengths on the rotatable disk into corresponding angular position values. In another embodiment, decoding the index point signal to obtain an angular position value includes decoding signals from a pattern of openings on the circumferentially extending row into the angular position value.

In another embodiment of the present invention, turning the rotary encoder includes operating an input device for a computer system. In another embodiment, turning the rotary encoder includes operating a joystick. In yet another embodiment, turning the rotary encoder includes operating a mouse coupled to a computer system. In another embodiment, turning the rotary encoder includes turning a mechanism that specifies a wind direction. In another embodiment, turning the rotary encoder includes turning a mechanism that specifies a rudder position.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Rotary Encoder with Multiple Calibration Points

Figure 1A:
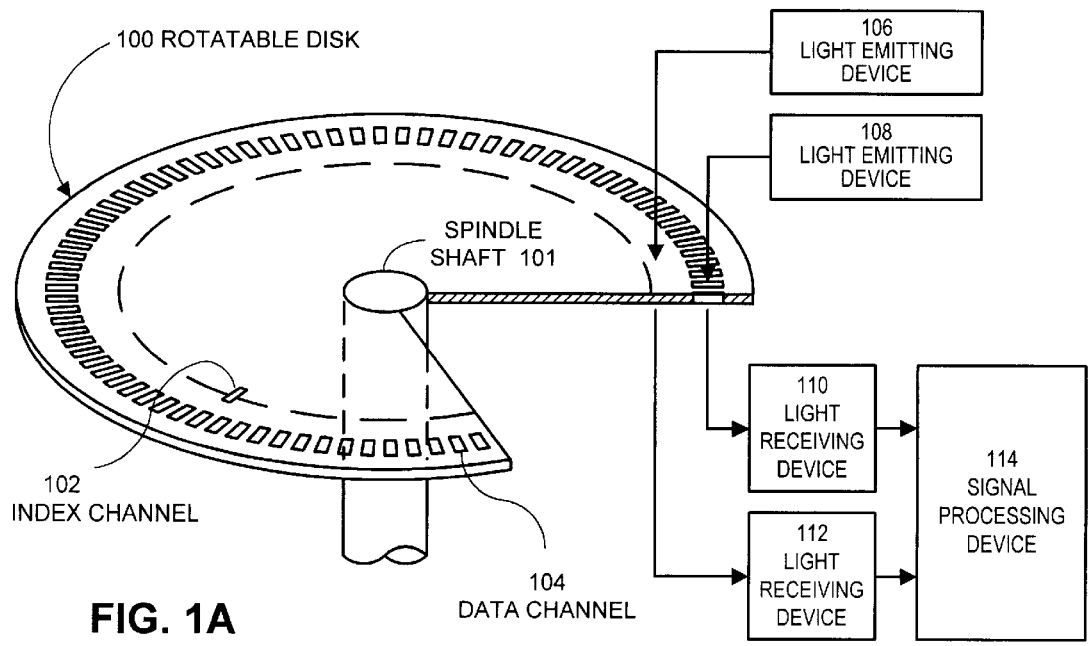
FIGS. 1A and 1B illustrate a prior art rotary encoder including an index channel with a single index point-per-revolution.
Figure 1B:
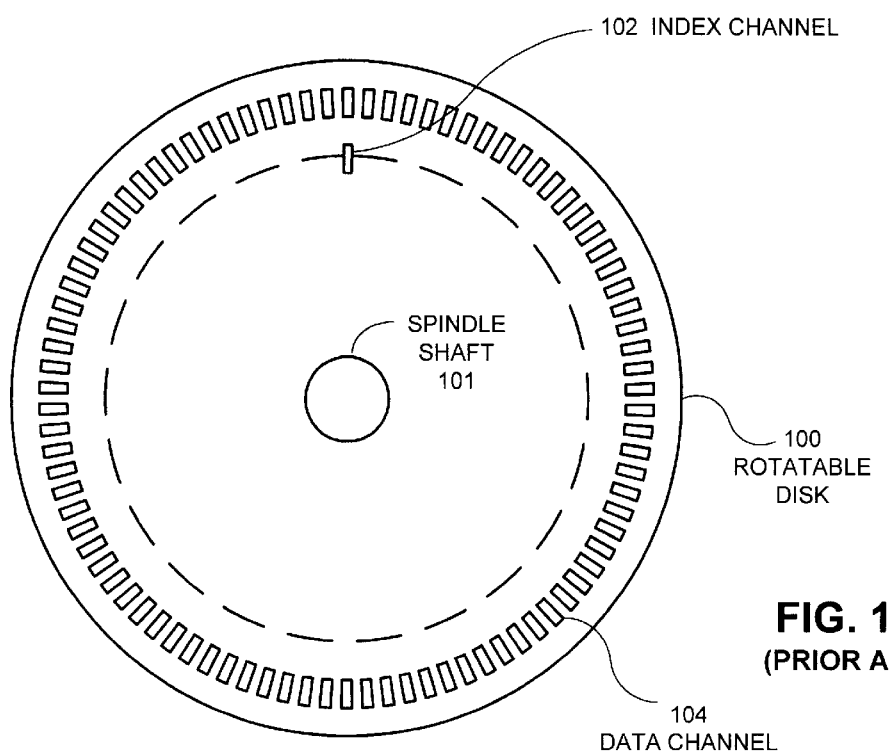
Figure 2:
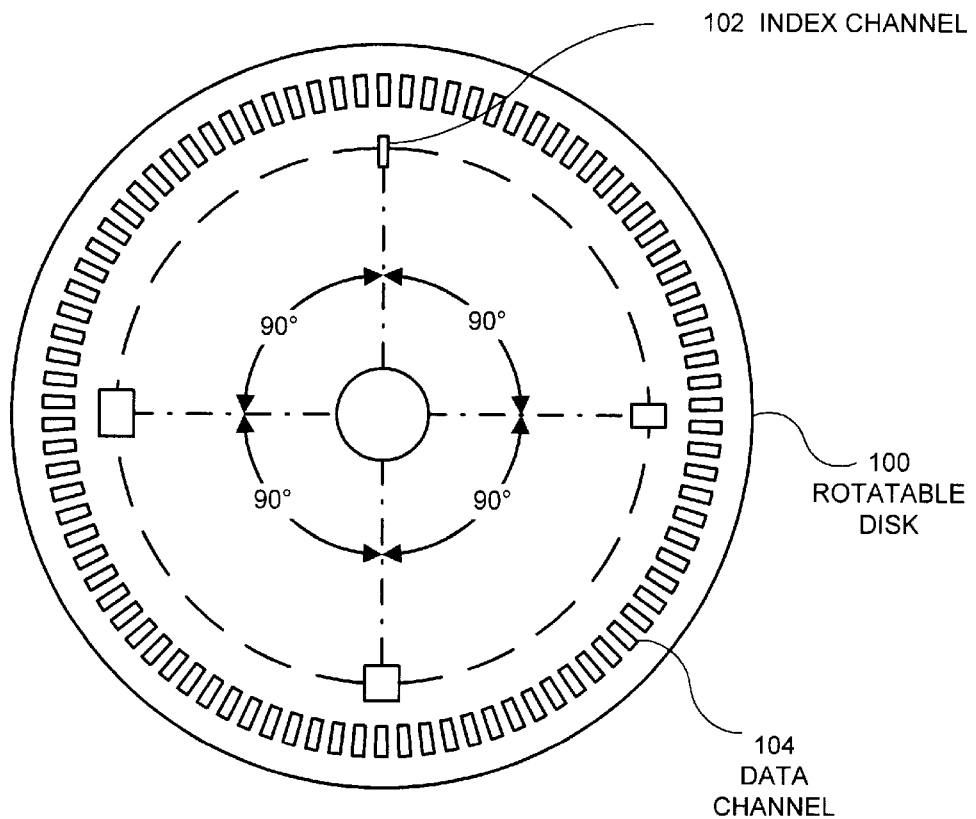
FIG. 2 illustrates the disk of a rotary encoder including multiple index-points-per-revolution in accordance with an embodiment of the present invention.

FIG. 2 illustrates the disk of a rotary encoder including multiple index-points-per-revolution in accordance with an embodiment of the present invention. The embodiment illustrated in FIG. 2 is similar to the prior art rotary encoder illustrated in FIGS. 1A and 1B, except that the embodiment illustrated in FIG. 2 includes multiple index points on index channel 102, instead of a single index point. Furthermore, these index points contain information specifying an angular position of the index point. The index channel illustrated in FIG. 2 includes four index points located on equally-spaced radii 90 degrees apart. These index points have openings of different sizes in order to uniquely identify the index points.

The rotary encoder illustrated in FIG. 2 can be calibrated as follows. First, the rotary encoder is rotated through at least a 90-degree angle to ensure that one of the index points from index channel 102 passes over light receiving device 112 (see FIG. 1A). Next, the signal from light receiving device 112 is read, and the size of the opening is examined to determine the identity of the index point to determine an angular position value of the index point. This angular position value is used to calibrate the index point. Note that the above method allows a rotary encoder to be calibrated by turning the rotary encoder through less than a complete revolution.

Other embodiments of the present invention include different numbers of index points. The only requirement is that the angular position of index points be ascertainable by reading a signal from the index points. Other embodiments of the present invention may have as few as two index points and as many as hundreds of index points.

Furthermore, other patterns can be used to encode the identity of index points. The embodiment illustrated in FIG. 2 includes openings of different size to differentiate index points. In other embodiments, an index point includes a pattern of openings, and this pattern of openings uniquely identifies the index point. For example, a binary code can be used. Other possible index point patterns can be used so long as an index point can be uniquely identified by reading a signal from the index point.

Description of Computer System

Figure 3:
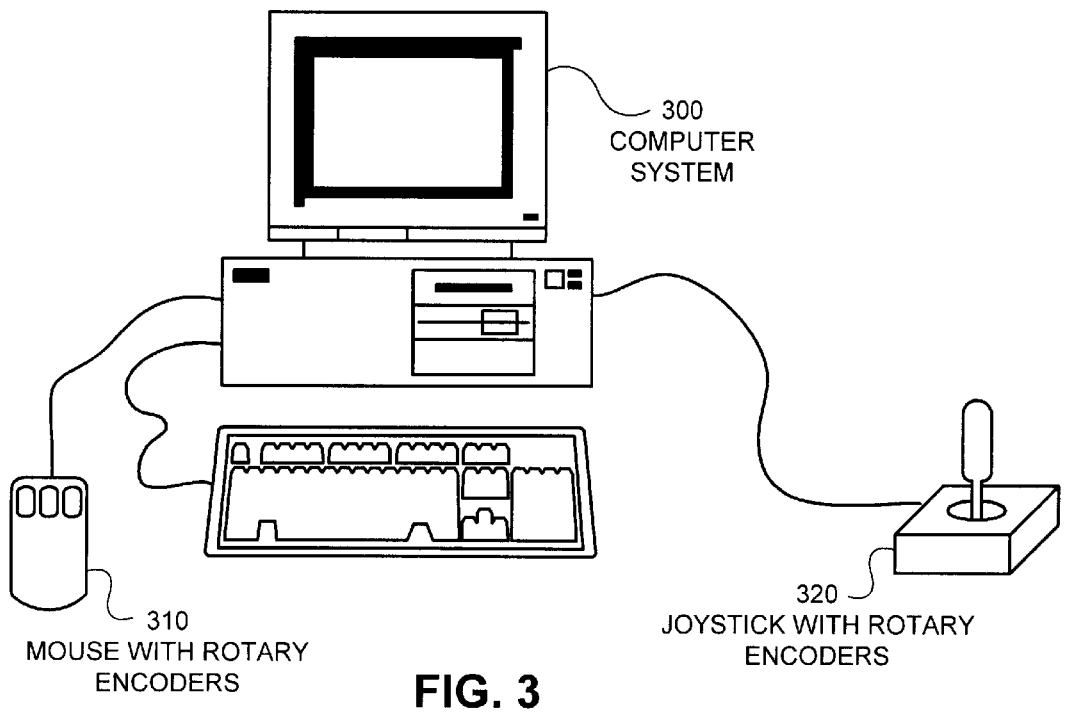
FIG. 3 illustrates a computer system 300 coupled to data input devices containing rotary encoders in accordance with an embodiment of the present invention.

FIG. 3 illustrates computer system 300 coupled to data input devices with rotary encoders in accordance with an embodiment of the present invention. Computer system 300 may be any type of computer system. This includes, but is not limited to, mainframe computer systems, microprocessor computer systems and device controllers. In the embodiment illustrated in FIG. 3, computer system 300 is coupled to mouse 310 and joystick 320. Both mouse 310 and joystick 320 include at least one rotary encoder to generate an angular position signal for computer system 300. This differs from some conventional input devices for computer systems that use potentiometers to indicate angular offsets from input devices.

Description of Method of Calibrating Rotary Encoder

Figure 4:
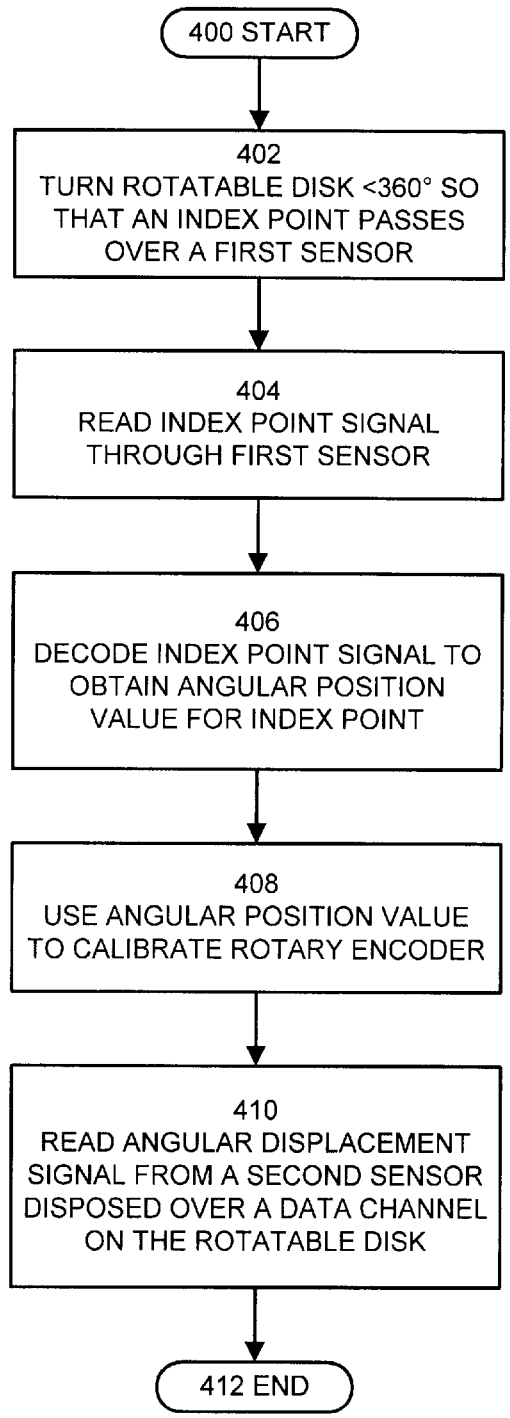
FIG. 4 is a flow chart illustrating some of the steps involved in calibrating a rotary encoder in accordance with an embodiment of the present invention.
Figure 5A:
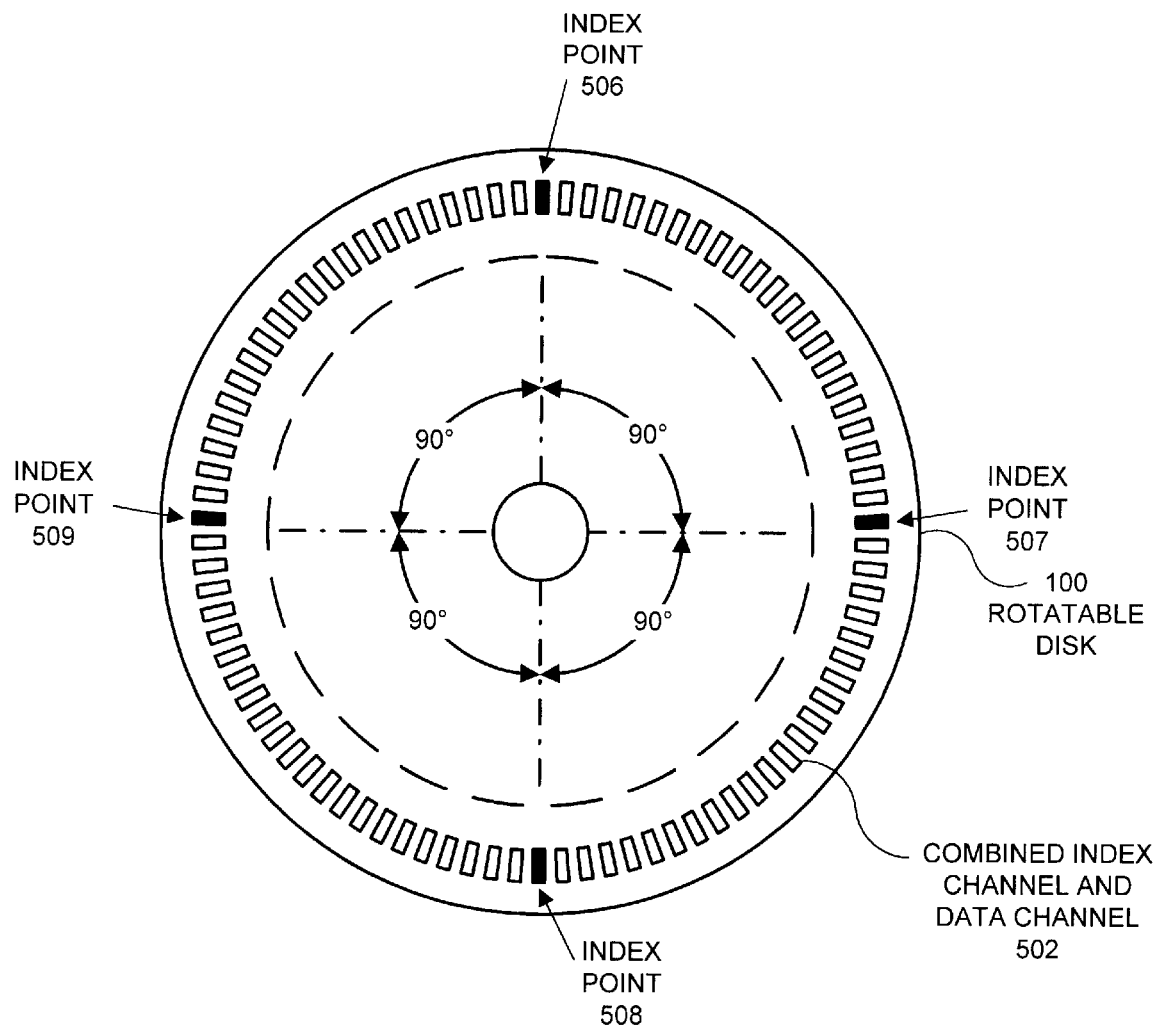
FIG. 5A illustrates the disk of a rotary encoder with a combined index channel and data channel in accordance with an embodiment of the present invention.
Figure 5B:
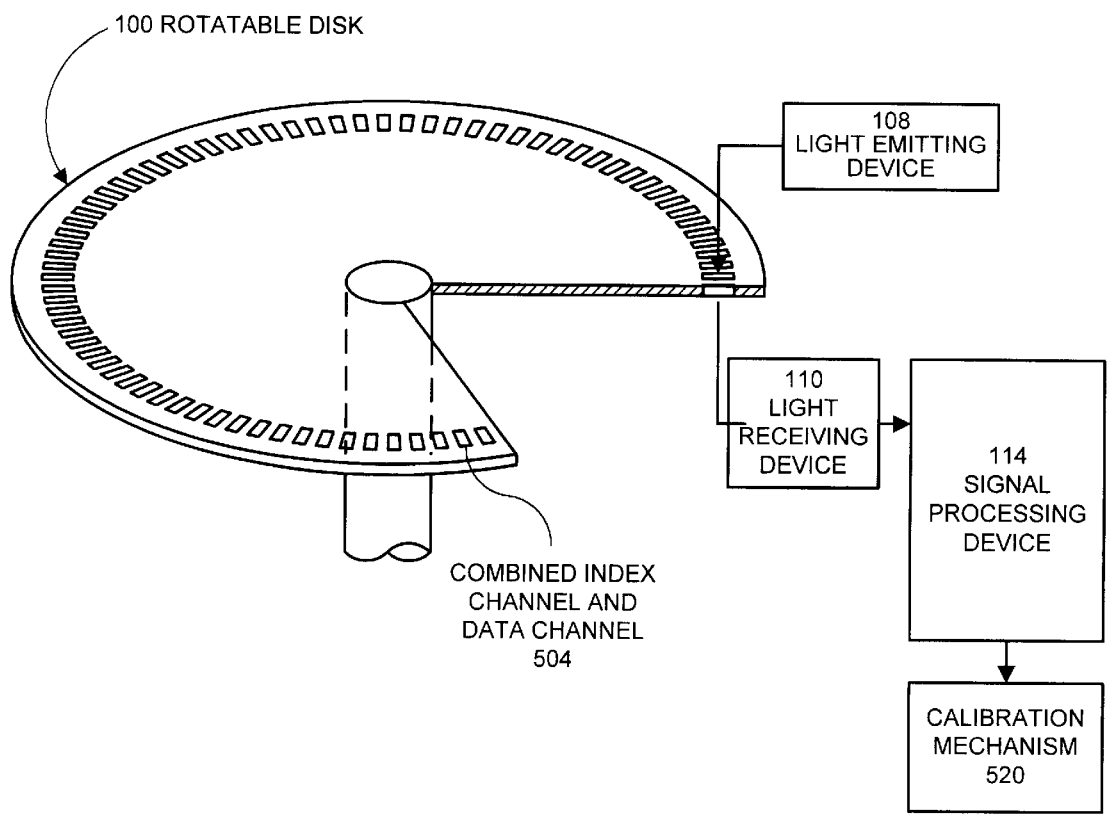
FIG. 5B illustrates a rotary encoder that uses a single light emitting device and a single light receiving device to read a combined index channel and data channel in accordance with an embodiment of the present invention.

FIG. 4 is a flow chart illustrating some of the steps involved in calibrating a rotary encoder in accordance with an embodiment of the present invention. The method starts in state 400 and proceeds to state 402. In state 402, the rotatable disk is turned less than a full revolution so that an index point passes over a first sensor. The method then proceeds to state 404. In state 404, the index point signal is read through the first sensor. The method then proceeds to state 406. In state 406, the index point signal is decoded to obtain an angular position value for the index point. The method then proceeds to state 408. In state 408, the method uses the angular position value to calibrate the rotary encoder. The method then proceeds to state 410. In state 410, the method reads an angular displacement signal from a second sensor disposed over a data channel on the rotatable disk. This angular displacement signal is used to produce an angular output signal from the rotary encoder. The system then proceeds to state 412, which is an end state.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. A method for calibrating a rotary encoder including a rotatable disk with at least two index points located along a circumferentially extending row on the rotatable disk, comprising:

turning the rotary encoder through a sufficient angular displacement to ensure that an index point passes over a first sensor in the rotary encoder, the sufficient angular displacement being less than a complete revolution;

wherein turning the rotary encoder includes turning the rotatable disk including a single circumferentially extending row of at least two index points located on equally-spaced radii, each index point encoding information specifying an annular position of the index point along a circumference of the rotatable disk;

reading the index point signal through the first sensor;

decoding the index point signal to obtain an angular position value for the index point;

using the angular position value to calibrate the rotary encoder; and reading an angular displacement signal from a second sensor disposed over a data channel on the rotatable disk;

wherein reading the index point signal and reading the angular displacement signal include reading signals from the same circumferentially extending row on the rotatable disk.

2. The method of claim 1, wherein the first sensor and the second sensor are the same sensor.

3. The method of claim 1, wherein decoding the index point signal to obtain the angular position value includes decoding signals from openings of differing lengths on the rotatable disk into corresponding angular position values.

4. The method of claim 1, wherein decoding the index point signal to obtain the angular position value includes decoding a signal from a pattern of openings on the circumferentially extending row into the angular position value.

5. The method of claim 1, wherein turning the rotary encoder includes operating an input device for a computer system.

6. The method of claim 1, wherein turning the rotary encoder includes operating a joystick.

7. The method of claim 1, wherein turning the rotary encoder includes operating a mouse coupled to a computer system.

8. A method for calibrating a rotary encoder including a rotatable disk with at least two index points located along a circumferentially extending row on the rotatable disk, comprising:

turning a rotational input mechanism causing the rotary encoder to turn through a sufficient angular displacement to ensure that an index point to passes over a first sensor in the rotary encoder, the sufficient angular displacement being less than a complete revolution;

wherein turning the rotary encoder includes turning the rotatable disk including a single circumferentially extending row of at least two index points located on equally-spaced radii, each index point encoding information specifying an angular position of the index point along a circumference of the rotatable disk;

reading an index point signal through the first sensor;

decoding the index point signal to obtain an angular position value for the index point;

using the angular position value of the index point to calibrate the rotary encoder; and reading an angular displacement signal from a second sensor disposed over a data channel on the rotatable disk;

wherein reading the index point signal and reading the angular displacement signal include reading signals from the same circumferentially extending row on the rotatable disk.

9. The method of claim 8, wherein turning the rotational input mechanism includes turning a mechanism that specifies a wind direction.

10. The method of claim 8, wherein turning the rotational input mechanism includes turning a mechanism that specifies a rudder position.

11. The method of claim 8, wherein turning the rotational input mechanism includes operating an input device for a computer system.

12. The method of claim 11, wherein operating the input device for the computer system includes operating a joystick.

13. The method of claim 11, wherein operating the input device for the computer system includes operating a mouse.

* * * * *